June 20, 1967 R. F. BRISBIN ETAL 3,326,101
APPARATUS FOR SOIL CEMENT STABILIZATION
Filed June 8, 1965 4 Sheets-Sheet 2

INVENTORS:
RICHARD F. BRISBIN
JAMES RAWSON
BY: Dawson, Tilton, Fallon, Lungmus & Alexander
ATT'YS

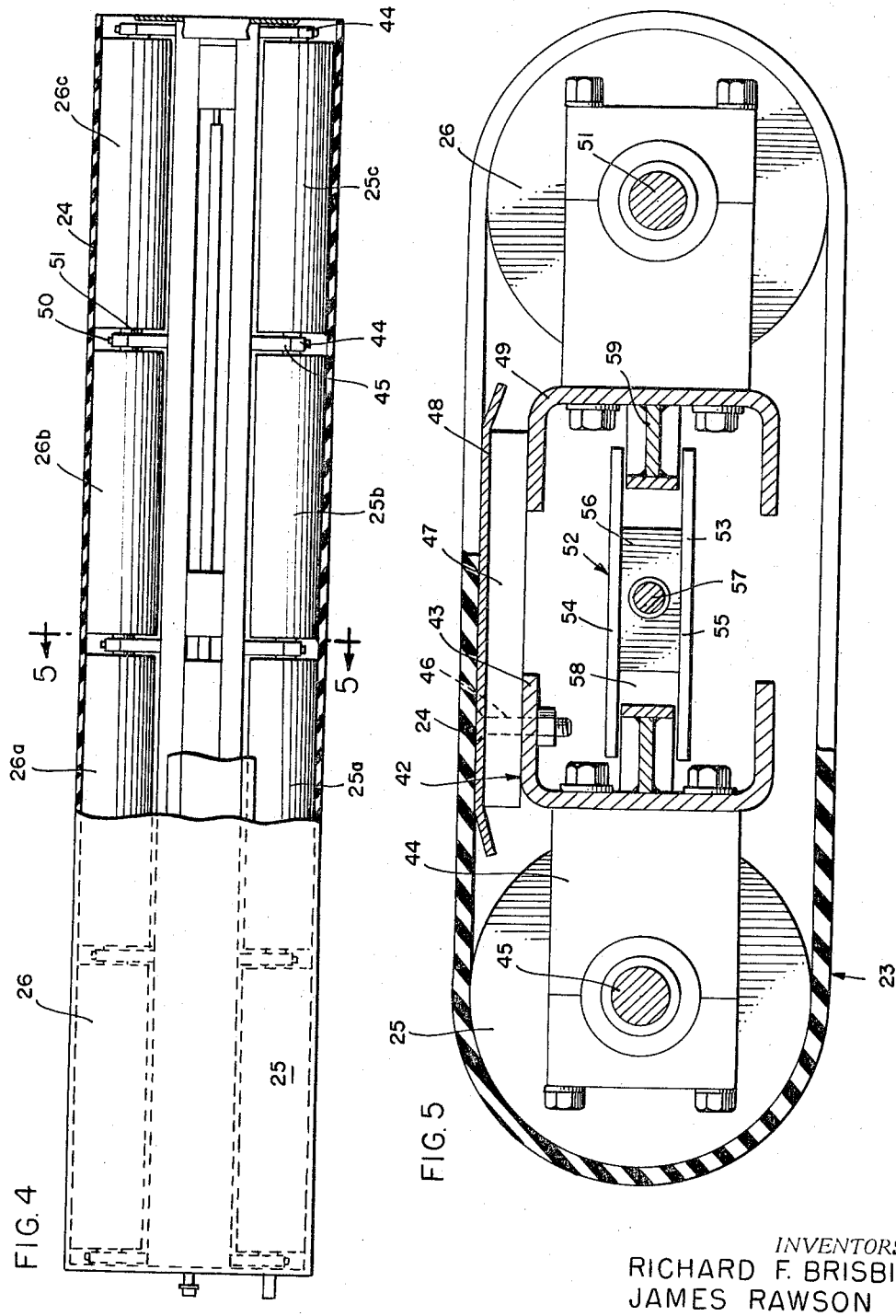

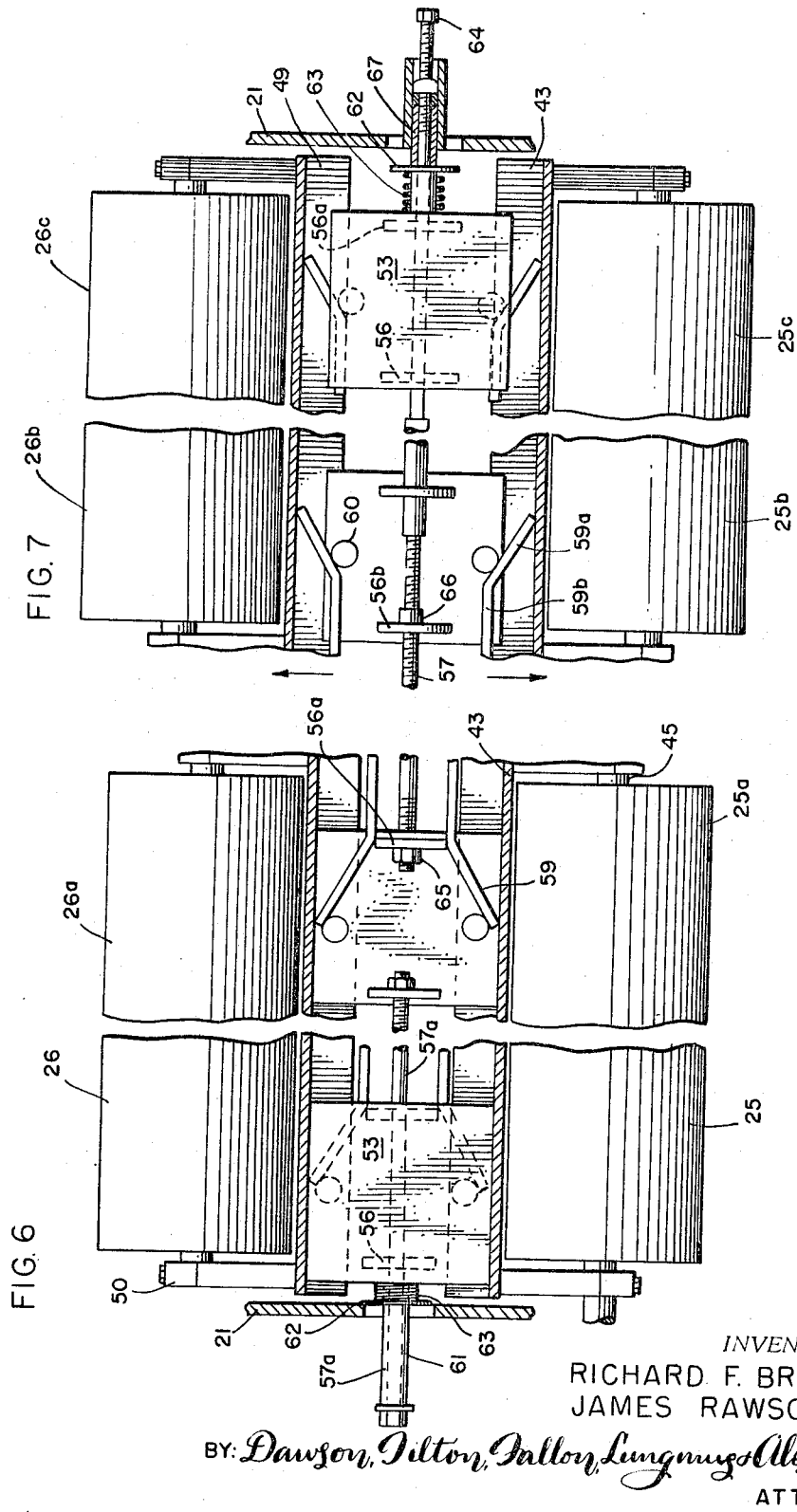

United States Patent Office 3,326,101
Patented June 20, 1967

3,326,101
APPARATUS FOR SOIL CEMENT STABILIZATION
Richard F. Brisbin, Mount Vernon, and James L. Rawson, Cedar Rapids, Iowa, assignors to Highway Equipment Company, Cedar Rapids, Iowa, a corporation of Iowa
Filed June 8, 1965, Ser. No. 462,266
3 Claims. (Cl. 94—46)

This invention relates to apparatus for soil cement stabilization and, more particularly, to spreader-type apparatus for use in conjunction with a dump truck or the like.

Soil cement, the area in which the inventive apparatus finds particular application, is a material of construction developed by mixing pulverized soil with the correct amount of Portland cement and enough water to permit maximum compaction. The resulting surface is a useful alternative to concrete or other paving materials. Soil cement has been known and used widely, particularly in those areas lacking in aggregates. In particular, soil cement has been used in conjunction with roads, as for the highways themselves, shoulders, and subbases. Soil cement further has application in dam and reservoir construction and other water bearing structures such as ditches and canals. However, the broadest use lies in the field of highway construction and in that area a problem has existed relative to achieving maximum strength in the cement-stabilized soil.

Having an important bearing in the difficulty of constructing soil cement road beds is the fact that for any given soil there exists a critical amount of cement required to stabilize the soil. For example, the normal range of cement requirements for B and C horizon soil is from 3 to 16%, while for black A horizon soils, the cement requirement may be as high as 22%—this being attributed to the presence of organic or other material which may be detrimental to the cement reaction.

The matter is further complicated by the fact that the character of the soil may change radically, especially in highway work where grading operations may expose different strata. Therefore, it will be appreciated that any apparatus for providing the essential ingredient for soil stabilization must be characterized by extreme versatility in operation. Further, and of equal importance, the apparatus must be able to deposit uniformly a predetermined quantity of Portland cement. Devices in the past for this purpose necessarily have been complex or inadequate. To achieve distribution of the proper amount of cement, the regulating devices required considerable attention and were generally complicated so that the desirable versatility was lacking. On the other hand, where procedures were followed that permitted a relatively easy change-over in formulation, the distribution was slow. Any attempt to speed up the distribution often resulted in a worsening of the procedure since additional time was required to undo the work previously done.

It is therefore an object of this invention to provide a novel distribution device for cement for use in soil stabilization and one which is characterized by an advantageous operation which avoids the difficulties and problems outlined above.

Another object is to provide a cement spreader such as would be useful in soil cement stabilization for highway work and the like which is characterized by novel and simple discharge regulating means which permit the achievement of a high speed, high quality cement distribution operation.

Still another object of this invention is to provide a vehicular device attachable to a dump truck or the like which is equipped with a hopper-like body and a novel discharge belt and gate for spreading cement for soil cement stabilization.

Yet another object is to provide a wheeled vehicle equipped with a hopper for loading with cement for distribution therefrom which is equipped further with a novel discharge belt arrangement in the hopper bottom and which is effective to bring about a controlled discharge of cement while operating over rugged terrain productive of shocks which might otherwise upset the delicate operation necessary in soil stabilization.

Other objects and advantages of this invention may be seen in the details of construction and operation of the inventive structure as set forth in the specification following.

The invention will be explained in conjunction with an illustrated embodiment in the accompanying darwing, in which:

FIG. 4 is an elevational view, partially in section of the conveyer apparatus seen in FIG. 3;

FIG. 5 is a sectional view taken along the line 5—5 of FIG. 4; and

FIG. 6 is a fragmentary top plan view of the left side of the conveyer partially in section.

FIG. 7 is a fragmentary top plan view of the right side of the conveyer partially in section.

Figure 1:
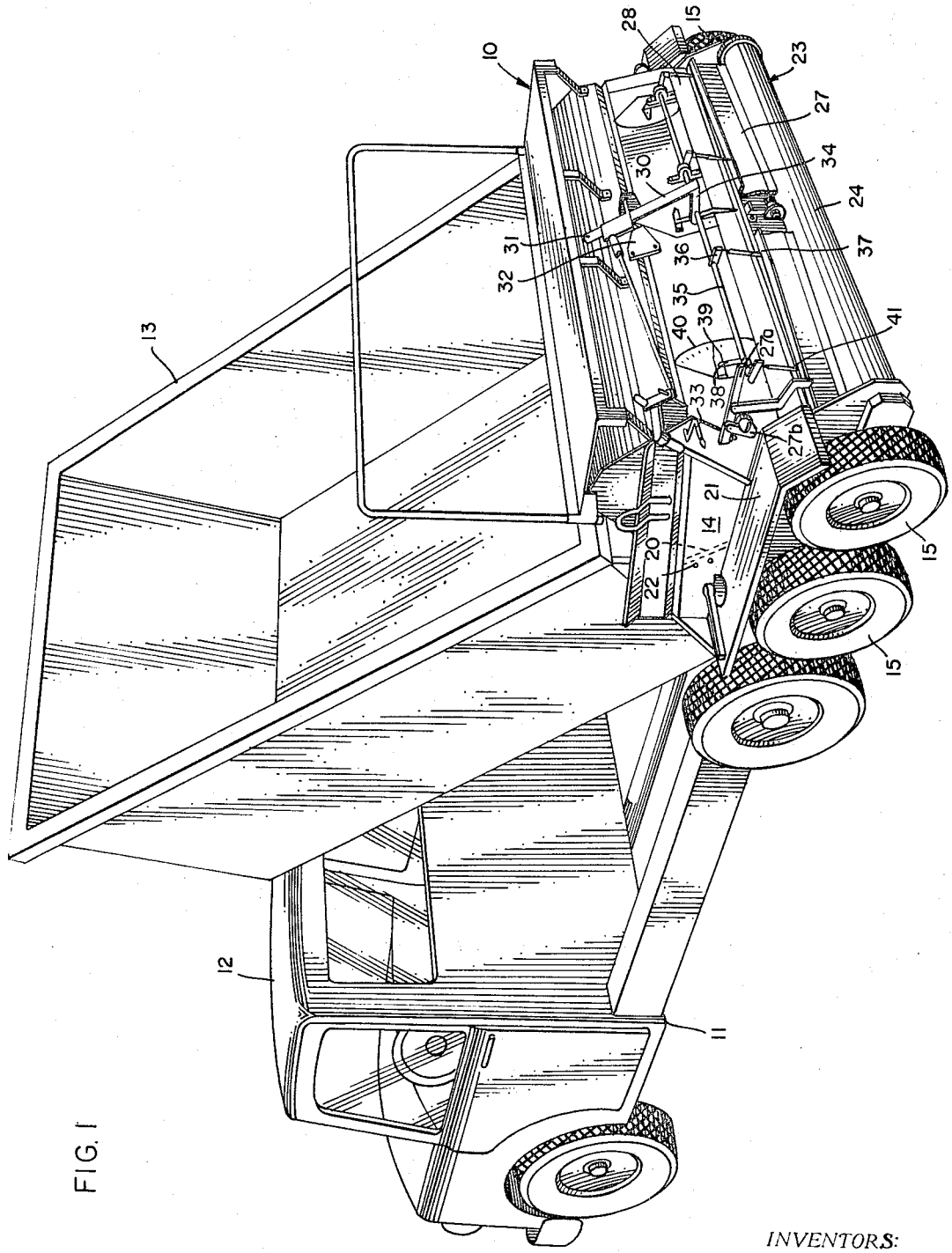
FIG. 1 is a perspective view of a spreading device embodying teachings of the invention and shown coupled to a dump truck.

Referring now to the drawing, and in particular, FIG. 1 thereof, the numeral 10 designates generally the inventive spreading attachment which is seen to be positioned at the rear of a dump truck designated 11. The truck 11 is seen to be of conventional form having a wheel equipped chassis 12 which tiiltably supports a dump box or body 13. The box 13 is adapted to carry Portland cement (not shown) for distribution to the apparatus 10, the truck 11 proceeding ahead of the apparatus 10 and down a path in which a road or other pavement is to be provided.

Material from the body 13 is discharged by gravity into the hopper-providing body 14 of the attachment 10. The body 14 is seen to be equipped with wheels 15 at the sides thereof, the body 14 being transversely elongated and rather short in its longitudinal dimensions—the longitudinal dimensions lying parallel with the path of travel of the truck 11 and apparatus 10. Thus, the wheels 15 are provided on the shorter sides and are suitably rotatably connected to the body 14.

Figure 2:
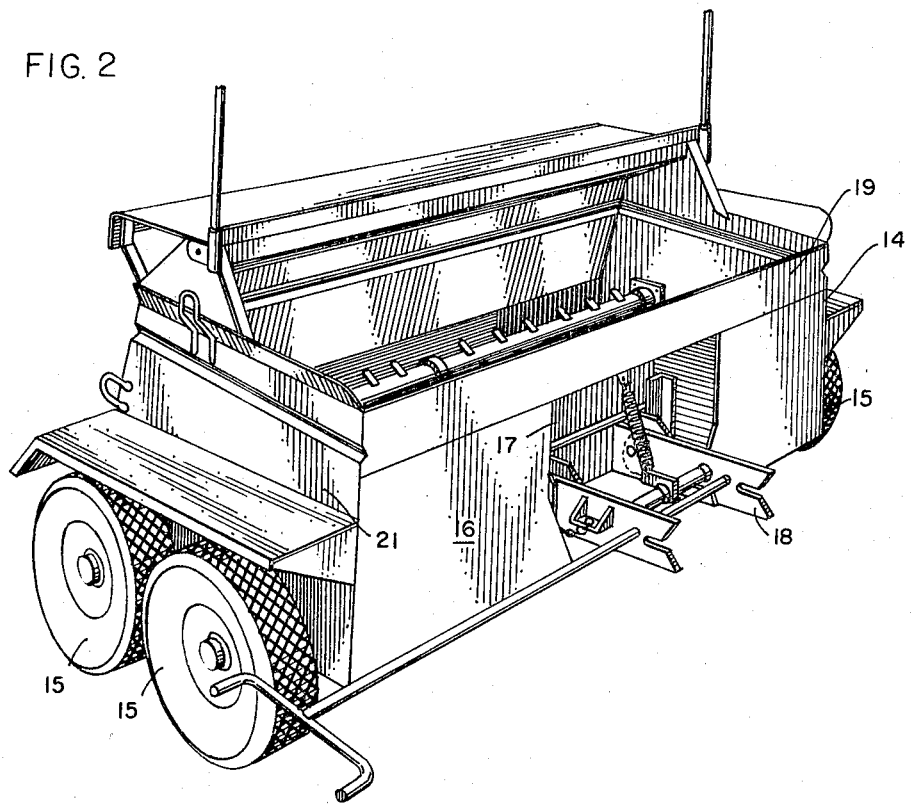
FIG. 2 is a perspective view of the spreading apparatus seen in FIG. 1, but differing therefrom in that the view is taken from the front end and illustrates the hitch mechanism employed for coupling the apparatus to a dump truck or other self-propelled vehicles.

As can be seen from FIG. 2, the forward vertical wall 16 of the body 14 is recessed as at 17 to provide a pivotal mounting for a hitch 18. The hitch 18 thus extends forwardly and is adapted to be coupled to the chassis 12 of the truck 11. The extreme upper edge of the wall 16 has secured to it an upwardly extending resilient bumper 19 which conforms to the rectangular end of the dump body 13 so that the contents of the body 13 are directed to the interior of the apparatus body 14. Further, the bumper 19 is adapted to shift position as the dump body 13 is tilted to a greater degree as is the case in the terminal stages of discharge of cement from the body 13.

The interior of the apparatus body 14 is equipped with a false forward wall as can be appreciated from the element designated 20 in FIG. 1. Thus, the forward inner wall of the hopper-providing body 14 accommodates the recess 17 for the hitch 18. The false forward wall 20 is anchored to the side walls 21 as by bolts 22 (see FIG. 1). The inclined forward wall 20 has an angle relative to the horizontal just greater than the angle of repose of Portland cement and, thus, is effective to support a substantial portion of the weight of the cement rather than have the entire weight bear against the conveyer generally designated 23 and which closes the open bottom of the hopper-providing body 14. The discharge end of the conveyer 23 may be seen in FIG. 1 and the conveyer itself is pictured in larger scale in FIG. 3.

Figure 3:
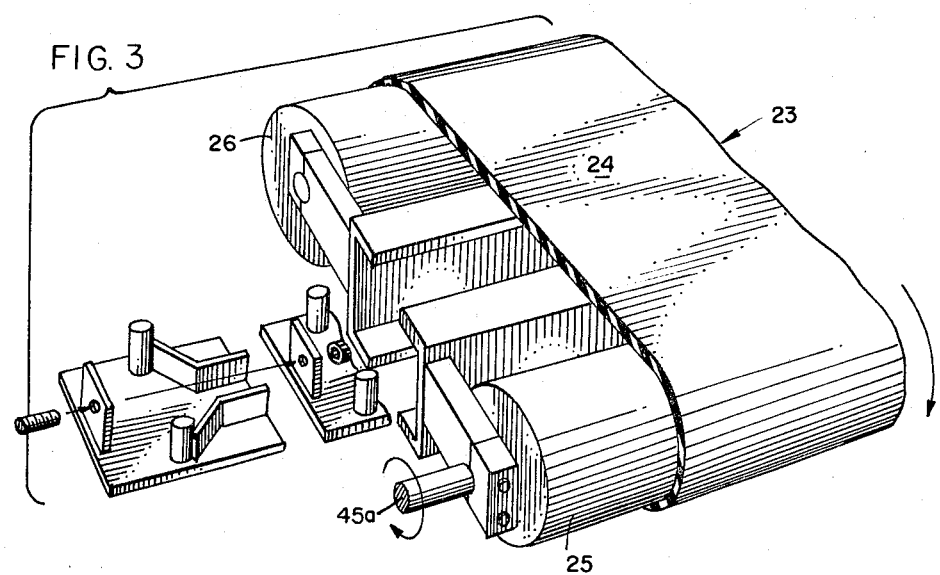
FIG. 3 is an exploded perspective view, partially in section which shows a fragment of the discharge conveyer provided in the apparatus seen in FIGS. 1 and 2, the extreme rear end of the conveyer being seen in FIG. 1.

The conveyer 23 is seen to include an endless belt 24 which is entrained over a driving roller 25 and an idler or tail roller 26 (see FIG. 3). Inasmuch as the tautness of the belt 24 will partially determine the amount of cement discharged from the apparatus 10, the belt tension is readily adjustable. By having the inclined wall 20 support a substantial portion of the cement weight load, this adjustment is facilitated.

Cooperating with the conveyer belt 24 and regulating the amount of cement discharged from the apparatus 10 are first and second gates 27 and 28 (see FIG. 1) which are pivotally mounted on the rear wall 29 of the hopper-providing body 14. The degree to which the regulating gate 28 is pivoted alters the aperture between the gate 28 and the belt 24 and, thus, determines the amount of cement spread. The belt 24 is advanced under the influence of the driving roll 25 which is mechanically connected to the wheels 15 so that the belt only urges cement against the gate 28 when the device 10 is being moved. The gate 27 is employed to completely shut off flow when distributing is not needed, therefore, the setting of the gate 28 need not be disturbed. Gate 27 is thus "ON-OFF."

The delicacy of this operation, especially the regulation of the gated discharge of the cement can be appreciated from the fact that the opening of gate 28 for a 5% cement volume in a 6 inch compact mixture is only about 1/32 inch. In such an instance, each square yard of soil cement 6 inches in compacted thickness would require 0.225 bag of cement, each bag of cement equaling 1 cubic foot and weighing 94 pounds. For a normal highway operation, the width of the belt 24 may be about 8 feet so that it is seen that even at low operating speeds, a considerable quantity of cement is discharged but in a very thin stream.

The spacing between the gate 28 and the belt 24 can be readily and accurately adjusted in order to meet different conditions through the operation of the gate lifting mechanism generally designated 30 in FIG. 1. The mechanism 30 includes an elongated member 31 which is adapted to be moved in a generally vertical direction relative to its mounting on the body 14 as at 32 and under the influence of a crank 33. The member 31 at its lower end is pivotally connected to an arm 34 which in turn is rigidly connected to a shaft 35 rotatably mounted on the rear wall 29 of the hopper-providing body 14. The shaft 35 is equipped with a plurality of rearwardly extending lugs 36 which are pivotally connected by means of turn buckle linkages 37 with the bottom edge of the gate 28. Thus, as the crank 33 is turned, the entire gate 28 is pivoted toward or away from the belt 24, as the case may be. Bearing against the upper outer side of the gate 28 are a plurality of link members 38. These link members in turn are pivotally connected to dial pointers 39 which are pivotally mounted on dials 40. The connection provides a multiplying linkage so that a slight opening of the gate 28 is magnified considerably for ready ascertainment by the apparatus operator.

Additionally, the turnbuckles 41 of each turnbuckle linkage 37 can be adjusted individually to vary the opening at different positions along the length of the gate 28. The provision of the selective adjustment made possible by the plurality of turnbuckle-equipped linkages enables the spreader 10 to distribute cement in various quantities across the width of the spreader which might be necessitated by differing soil conditions or contours. The driver of the truck 11 merely adjusts a given turnbuckle 41 so that the dial settings are in accordance with instructions from the highway engineer or other job superintendent.

The conveyer 23, which can be seen in enlarged scale in FIG. 5, is releasably secured within the body 14 and includes the aforementioned elements, the belt 24, the drive roller 25 and the idler roller 26. For the purpose of removably supporting the conveyer 23 within the body 14, a conveyer frame generally designated by the numeral 42 is provided. The frame 42 provides the support for the rollers 26 and 25 and is equipped with means (not shown) for mounting the conveyer 23 on the side walls 21 of the body 14. For example, the conveyer 23 occupies the open bottom of the hopper-providing body 14 and may be readily removed for repair or replacement merely by unloosening bolts which extend through the walls 21 into the frame 42.

The frame 42 is seen to include a first channel-shaped member 43 which is seen to extend generally across the width of the body 14 (see FIG. 4). Extending forwardly of the channel member 43 are a plurality of special bearings 44 (see FIG. 4). A transverse shaft 45 is mounted in the bearings 44 and secured to the shaft 45 are four rolls 25, 25a, 25b and 25c.

Secured to the upper flange 43a of the channel member 43, as by bolts 46 is a guide plate 47 (see FIG. 5). The guide plate 47 along with an upper plate 48, serves to support the upper run of the endless conveyer belt 24. The guide plate 47 additionally serves to stabilize a movable channel member 49 which is equipped with bearings 50 longitudinally aligned with the bearings 44 and which serve to support a transverse shaft 51 (the shaft 51 being disposed generally parallel to the shaft 45). Mounted on the shaft 51 are four idler rollers 26, 26a, 26b and 26c (see FIG. 4) which are aligned with the correspondingly designated drive rollers 25, 25a, 25b and 25c provided on shaft 45. It will be appreciated that movement of the channel 49 serves to tension or slacken the belt 24 depending upon the movement of the member 49 relative to the channel 43. A mechanism generally designated 52 is provided for moving the channel 49 which additionally supports the same and this mechanism will now be described.

The mechanism 52 for moving the channel 49 is seen to include a plurality of plate positioners 53 (see FIG. 6). Each plate positioner 53, as can be appreciated from FIG. 5, includes an upper plate 54 and a lower plate 55 secured to a central block 56. The central block 56 (two of which are provided for each plate positioner 53 as can be appreciated from FIG. 6) is apertured for the receipt of a threaded shaft 57. Each plate 54 and 55 extends laterally outward of the blocks 56 (again, see FIG. 5) and within the guide track 58 so provided are received inward, angled extensions 59 which are secured as by welding to the channel members 43 and 49. The extensions 59 which can be seen in perspective detached form in FIG. 3 are adapted to abut against upstanding posts 60 extending between the plates 54 and 55. Thus, as the plate member 53 is moved transversely of the travel of the belt 24, the posts 60 engage different portions of the angled extensions 59 and serve to spread the channel members 43 and 49 apart or bring them together, depending upon the type of movement introduced into the threaded shaft 57.

In the embodiment illustrated, the shaft 57 is provided in two sections, one for moving the rollers 26 and 26a away from the rollers 25 and 25a, while the other shaft which is designated 57a is effective to move the rollers 26b and 26c away from the rollers 25 and 25c. The various positions of the rollers can be seen in FIGURES 6 and 7. FIGURE 6 shows the two left hand rollers at their minimum spacing while FIGURE 7 shows the two sets of right hand rollers at their maximum spacing. Only two of the four rollers previously described for each shaft are pictured in the two portions of FIGS. 6 and 7.

Each shaft 57 and 57a is equipped with a sleeve 61 which has at its inner end a flange 62 (see FIG. 6). Extending between the flange 62 and the adjacent block 56 is a coil spring 63. Thus, the sleeve 61 can be pushed inwardly of the hopper walls 21 to expose the end of the shaft 57 or 57a.

*Operation*

In the operation of the spreader 10, the belt 24, in the upper run thereof, is advanced toward the rear wall 29 and the gates 27 and 28 under the rotation of the shaft 45—the shaft 45 carrying the drive rollers 25, 25a, 25b, and 25c. For this purpose, the shaft 45 is extended as at 45a (see FIG. 3) for coupling with the right front wheel 15a. Inasmuch as the channel member 43 is releasably but immovably coupled to the body 14, (the channel member 49 being the movable or floating member), the drive connection between the wheel 15a and the shaft extension 45a may be readily accomplished by means of spur gears or the like.

To alter the thickness and pattern of distribution, the spacing of the gate 28 above the belt 24 can be varied, or the tension in the belt 24 itself can be regulated. For positioning the gate, the crank 33 can be turned which elevates the gate uniformly across its width. For a more selective spacing of the gate, which may be a neoprene sheet backed by a steel plate, the linkage members 37 may be shortened or lengthened as desired. Any selective change in the length in any one of the elements 37 will result in a change in the otherwise planar configuration of the gate 28 and will be reflected on one or more of the dials 40.

Further adjustment may be made by turning the shafts 57 and 57a to position a different portion of the wedge-providing surfaces of the elements 59 against the posts 60. Through this operation, in the embodiment illustrated, the shafts 45 and 51 can be moved from a minimum spacing of 11½ inches to a maximum spacing of 13½ inches. The belt itself, as illustrated, is 8 feet wide so as to effectively distribute cement over the width of an entire lane of road.

The secondary gates 27 (see FIG. 1) is used to eliminate free flow of the material being spread (cement or lime) by being opened only during the spreading operation. For this purpose it is only necessary to raise the handle 27a and engage the latch 27b. When spreading is completed and the apparatus is being relocated, the latch 27b is disengaged and the gate 27 again closed. Advantageously, the gate 27 may be equipped with a resilient edge along its lower side to engage the conveyer belt 24. From this, it can be seen that the gate 27 is essentially a control gate for ON-OFF operation, while the gate 28 which regulates the amount of material discharged is essentially a modulating gate.

While in the foregoing specification, I have set forth a detailed description of an embodiment of the invention for the purpose of explanation thereof, many details herein given may be varied by those skilled in the art without departing from the spirit and scope of the invention.

I claim:

1. In an apparatus for spreading cement, a generally rectangular four-sided casing having an open bottom, the opposite shorter sides being equipped with wheels for advancing said casing parallel to said shorter sides, one of said longer sides providing the rear of said casing and equipped along its lower edge with a gate movably attached to said casing, the other of said longer sides being inclined at an angle relative to the horizontal greater than the angle of repose of said cement, a pair of shafts mounted in spaced apart parallel relation in said casing below said gate, said shafts having an endless belt entrained thereon, said casing being equipped with a removably mounted frame adjacent the bottom thereof, said frame including a pair of spaced transverse members rotatably supporting said shafts, each of said members being equipped with wedge-surfaced elements on the sides thereof adjacent the other member, a plurality of blocks interposed between said members and having a laterally disposed track means receiving said elements, means for moving said blocks transversely of said casing, means coupling said casing and said gate for selectively varying the spacing of said gate and belt.

2. The structure of claim 1 in which said blocks include an upper plate, a lower plate and a central block therebetween, post means extending between said upper and lower plates, said post means adapted to engage the wedge-surfaced eements when said blocks are moved laterally.

3. The structure of claim 2 including a shaft threadably engaged with said central blocks for moving said blocks laterally.

References Cited

UNITED STATES PATENTS

| 1,702,525 | 2/1929 | Smith | 94—44 X |
| 1,755,120 | 4/1930 | Kerr | 275—2 |
| 1,885,319 | 11/1932 | Baumgardner | 94—44 X |
| 2,300,753 | 11/1942 | Wagner et al. | 214—83.2 |
| 2,669,915 | 2/1954 | McConnaughay | 94—44 |
| 3,109,352 | 11/1963 | Mack | 94—44 X |
| 3,187,944 | 6/1965 | Stock | 222—55 |
| 3,206,174 | 9/1965 | Young | 94—46 |

FOREIGN PATENTS

| 1,185,180 | 2/1959 | France. |
| 885,126 | 12/1961 | Great Britain. |

JACOB L. NACKENOFF, *Primary Examiner.*